United States Patent
Reithmaier

(10) Patent No.: US 7,180,275 B2
(45) Date of Patent: Feb. 20, 2007

(54) DC-DC HIGH FREQUENCY BOOST CONVERTER

(75) Inventor: Stefan Reithmaier, Vilsheim (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/115,524

(22) Filed: Apr. 26, 2005

(65) Prior Publication Data

US 2005/0242788 A1    Nov. 3, 2005

(51) Int. Cl.
    *G05F 1/62*    (2006.01)
(52) U.S. Cl. ........................ 323/222; 323/299
(58) Field of Classification Search ........... 323/222, 323/223, 265, 282, 284, 299, 351
    See application file for complete search history.

(56) References Cited

U.S. PATENT DOCUMENTS

| | | | |
|---|---|---|---|
| 5,367,247 A * | 11/1994 | Blocher et al. | ............. 323/222 |
| 5,457,624 A | 10/1995 | Hastings | |
| 6,160,388 A | 12/2000 | Skelton et al. | |
| 6,166,526 A | 12/2000 | Greitschus | |
| 6,246,220 B1 | 6/2001 | Isham et al. | |
| 6,643,145 B1 | 11/2003 | Harrison | |
| 6,693,411 B2 * | 2/2004 | Bub et al. | ................... 323/282 |

* cited by examiner

*Primary Examiner*—Gary L Laxton
(74) *Attorney, Agent, or Firm*—Carlton H. Hoel; W. James Brady; Frederick J. Telecky, Jr.

(57) ABSTRACT

A DC-DC high frequency boost converter with a supply voltage input (110), a boosted voltage output (112), a series circuit of an inductor (114) and a rectifying device (116) connected in series between said supply voltage input (110) and said boosted voltage output (112), has a switch (124) connected between ground and a connection node (120) of said inductor (114) and said rectifying device (116). A control circuit (126) is provided for controlling said switch (124), and a zero inductor current detection circuit (128) is provided that compares a voltage ($U_n$) on said connection node (120) with a reference voltage ($U_{ref}$) and provides a zero inductor current indication (Comp) when both voltages are equal.

5 Claims, 2 Drawing Sheets

DC-DC HIGH FREQUENCY BOOST CONVERTER

CROSS REFERENCE TO RELATED APPLICATIONS

This application claims priority under 35 USC § 119 of German Application Serial No. 10 2004 021437.9, filed Apr. 30, 2004.

FIELD OF THE INVENTION

The present invention relates to a DC-DC high frequency boost converter with a supply voltage input, a boosted voltage output, a series circuit of an inductor and a rectifying device connected between the supply voltage input and the boosted voltage output, a switch connected between ground and a connection node of the inductor and the rectifying device, and a control circuit for controlling the switch.

BACKGROUND OF THE INVENTION

In such boost converters that operate in voltage mode at a fixed frequency, the output voltage is a function of the duty cycle which depends on the ratio between the on-time and the off-time of the switch. As long as the load current is high enough, the converter can operate in continuous mode: the inductor current increases when the switch is closed, and decreases when the switch is open, but it will never become zero. In this mode, the output voltage is a function of the duty cycle only and does not depend much on the output current.

If the load current decreases below a lower limit, the inductor current will cease during part of the off-time, and the converter works in discontinuous mode. In this mode, the relation between duty cycle and output voltage is different, so the control of the switch has to be adapted, e.g. the control for the switch may turn to a different loop gain or into a power save mode. Therefore, it is necessary to detect the transition from continuous to discontinuous mode and back by monitoring the coil current. Usually, this is done by monitoring the output current, for example by measuring the voltage drop across a sensing resistor in the output path or across the rectifying device during the off time of the switch.

FIG. 1 shows an example of such a conventional asynchronous boost converter. The converter has a supply voltage input 10 and a boosted voltage output 12 and comprises a serial circuit of an inductor 14 and a diode 16 between the supply voltage input 10 and the voltage output 12. The connection between the inductor 14 and the diode 16 constitutes a connection node 20. A transistor 24 acts as a switch, connected between the connection node 20 and ground and is controlled by a control circuit 26. A comparator circuit 28 for monitoring the inductor current in the off-phase has one input connected to the connection node 20, another input connected to the voltage output 12 and an output connected to the control circuit 26. The comparator 28 is only enabled and evaluated during the off-phase of the transistor 24. In this phase, the comparator 28 senses the voltage drop over the diode 16 and provides an output signal for the control circuit 26 when the inductor current becomes zero.

The diagrams of FIG. 2 show the inductor current $I_L$, the corresponding voltage $U_n$ at the connection node 20 and the comparator output signal COMP over time. As long as the inductor current does not reach zero, the converter operates in continuous mode. The voltage $U_n$ at the node 20 changes between nearly zero in on-phase and the output voltage plus the diode voltage. This mode comprises the first four periods in FIG. 2.

When at $t=t_0$ the inductor current becomes zero, the voltage at the node 20 drops to the level of the input voltage $U_{in}$ and the converter starts operating in the discontinuous mode. Parasitic inductance and capacitance at the node 20, e.g. due to the FET-transistor 24 and the length of the connection lines to the diode 16, limit the decay speed of the node voltage $U_n$. Therefore, it may take a few ten of ns until the voltage $U_n$ crosses the level of the output voltage $U_{out}$, which means that the voltage drop over the diode and hence the inductor current have become zero, and the comparator 28 can detect the transition.

In FIG. 2, it is not until the second instance $t_{02}$ of the inductor current $I_L$ reaching zero, that the comparator delivers an output signal. Since the comparator 28 also adds some nanoseconds for detection, a delay δ as indicated in FIG. 2 occurs between the rising edge of comparator signal and the time when the inductor current actually gets zero. At high switching frequencies (>1 MHz) the impact of this delay δ gets too high and results for example in efficiency loss, if the comparator signal is used to switch into a power save mode. Further, especially when high output current is required, the diode is preferably located outside the chip hosting the other components, resulting in high parasitic inductances caused by bond wires.

SUMMARY OF THE INVENTION

The present invention provides a DC-DC high frequency boost converter with a simplified circuit layout and a fast zero-current detection.

Specifically a DC-DC high frequency boost converter with a supply voltage input, a boosted voltage output and an inductor and a rectifying device connected in series between the supply voltage input and the boosted voltage output is provided. The converter comprises a switch which is connected between ground and a connection node of the inductor and the rectifying device. The converter comprises further a control circuit for controlling this switch and a zero inductor current detection circuit that compares a voltage on the connection node with a reference voltage and provides a zero inductor current indication when both voltages are equal. With the proposed converter, the node voltage instead of the output current is monitored. Monitoring the output current by measuring the voltage drop across a series-connected sensing resistor would require a fast comparator for detecting the transient state where the voltage drop across the resistor is zero. With the inventive comparator, no sensing resistor in the output path, not even sensing lines to the output are required, which provides for a simplified circuit layout and a fast zero-current detection without the need for a fast comparator.

In a preferred embodiment of the invention, the zero current detection circuit comprises a comparator with a first input connected to the connection node through a sampling switch, a second input connected to a reference voltage source and an output connected to a control input of the control circuit. The sampling switch provides a stable and continuous signal for the current detection circuit. Therefore, the comparator needs not to be very fast. Also, parasitic inductance and capacitance on the connection node which are difficult to predict do not have to be considered any longer.

DETAILED DESCRIPTION OF THE DRAWINGS

Figure 1:
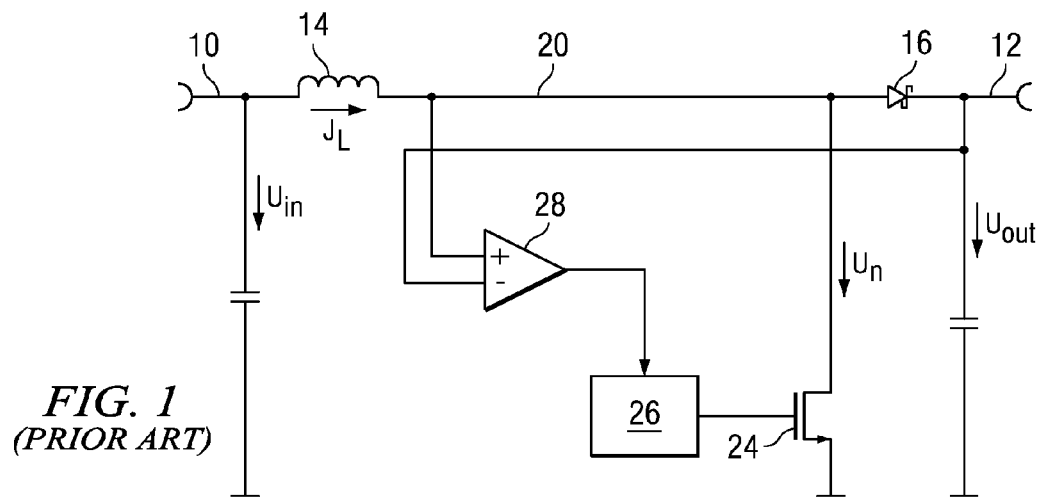
FIG. 1 shows a schematic of a boost converter from the state of the art.
Figure 2:
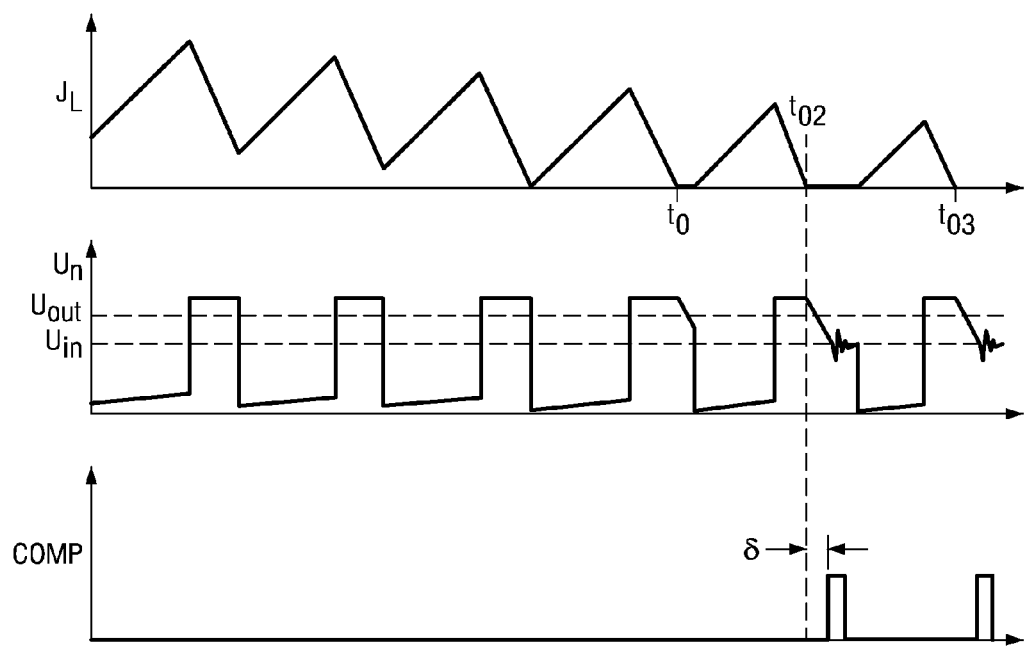
FIG. 2 shows a diagram illustrating inductor current, node voltage and operator output signal of the converter of FIG. 1.
Figure 3:
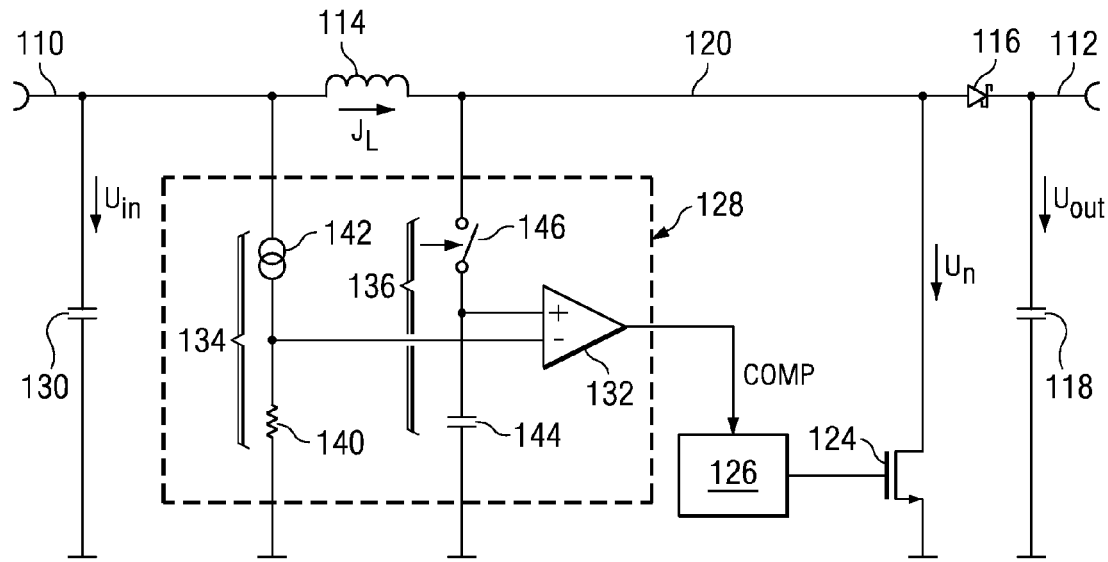
FIG. 3 shows a schematic of a boost converter according to the invention.

Referring now to FIG. 3, there is shown a schematic of a DC-DC high frequency boost converter according to the invention. The converter comprises a supply voltage input 110, a boosted voltage output 112, a series circuit of an inductor 114 and a diode 116, a load capacitor 118 and a power switch 124. The converter further comprises a control circuit 126 for controlling the power switch 124 and a zero inductor current detection circuit 128.

The supply voltage input 110 is buffered with a source capacitor 130 connected between the input 110 and ground. The inductor coil 114 is connected with one end to the supply voltage input 110 and with the other end to the anode of the rectifying device 116 which is constituted by a schottky diode in this embodiment. The cathode of the schottky diode 116 is connected to a boosted voltage output 112 which is also connected to the load capacitor 118. The connection between the inductor 114 and the diode 116 forms a connection node 120.

The switch 124 is a NMOS-FET and has its drain connected to ground, its source connected to the connection node 120 and its gate connected to the output of control circuit 126.

The zero inductor current detection circuit 128 comprises a comparator 132, a reference voltage source 134, connected to the first input of a comparator 132, and a sampling unit 136 connected to the second input of the comparator 132. The output of the comparator 132 is connected to the control circuit 126. The reference voltage source 134 comprises a serial circuit of a resistor 140 and a current source 142 connected between ground and the voltage input 110. The sampling unit 136 comprises a sampling capacitor 144, connected between ground and the second input of the comparator 132 and a sampling switch 146 connected between the connection node 120 and the second input of the comparator 132.

The control unit 126 controls the switch 124 to connect or disconnect the node 120 with ground in a known manner in order to regulate the output voltage $U_{out}$ at the output 112 by controlling the duty cycle for the switch 124.

Figure 4:
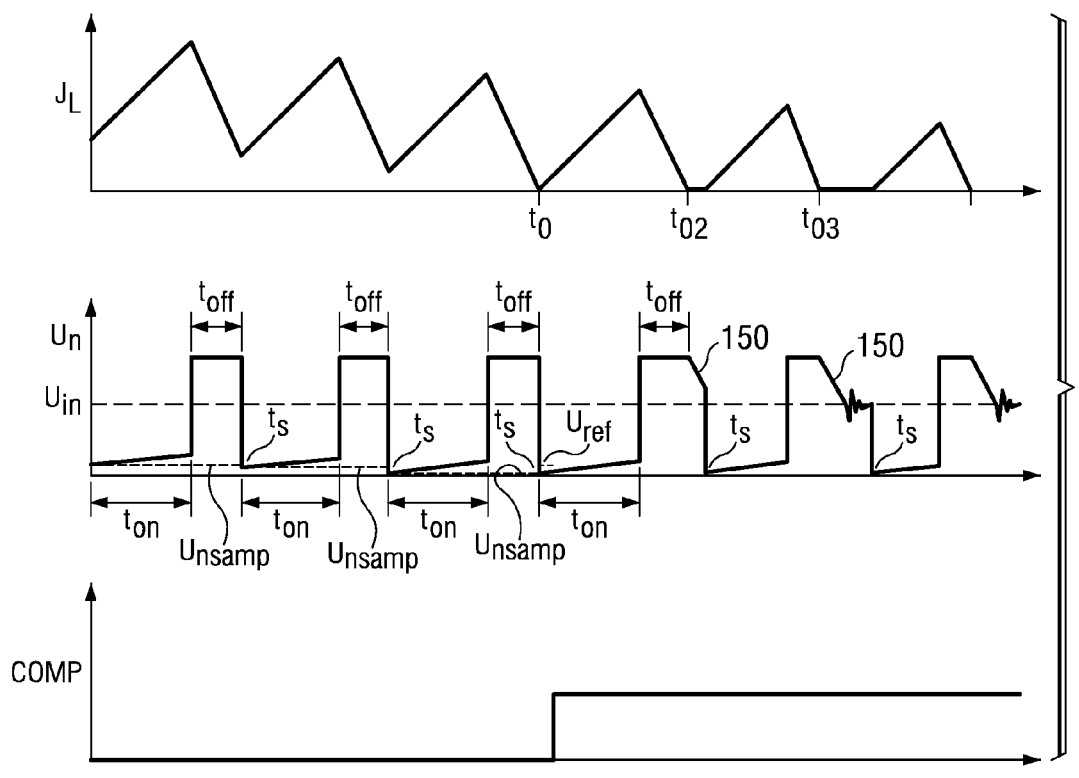
FIG. 4 shows a diagram illustrating inductor current, node voltage and comparator output of the converter from FIG. 3.

The diagram of FIG. 4 shows the voltage $U_n$ on the connection node 120 over time. It can be seen that in the on-phase $t_{on}$, when the switch 124 is closed, the node voltage $U_n$ is low, since only the voltage drop over the switch 124 occurs. Since the coil current $I_L$ is rising, the node voltage $U_n$ is also rising slightly. In the off-phase $t_{off}$, the switch 124 opens and the node voltage $U_n$ leaps to $U_{out}$ plus the voltage drop over the diode 116.

The mean value of the inductor current $I_L$ is slowly decreasing with time. When in the off-phase, the inductor current $I_L$ reaches zero at $t=t_0$, the node voltage $U_n$ drops to the value of the input supply voltage $U_{in}$, the converter is now working in discontinuous mode.

The transition to the discontinuous mode is detected by the zero inductor current detection circuit 128. In the circuit 128, the sampling unit 136 samples the node voltage $U_n$ by closing the sampling switch 146 for a short time, just after the power switch 124 also has closed. The sampling switch 146 is held close only for a very short time, which is sufficient to load the sampling capacitor 144. The sampled node voltage $U_{nsamp}$ is compared in the comparator 132 with the reference voltage $U_{ref}$ supplied by the reference voltage source 134. If the sampled node voltage $U_{nsamp}$ is below the reference voltage $U_{ref}$, the comparator 132 provides a comparator signal COMP to the control circuit 126, indicating that the transition has occurred. With this signal, the control circuit 126 is able to change its control mode, for example it may switch to a power save mode or to another loop gain for regulating the output voltage via the duty cycle for the power switch 124. This provides for a very efficient operation of the boost converter.

Since it will take some time, typically nanoseconds, to charge the sampling capacitor 144, and even in this short time the node voltage $U_n$ rises, the reference voltage $U_{ref}$ preferably is some millivolts above ground as indicated in FIG. 4, in order to compensate for the rise the node voltage $U_n$ during the charging time. Of course, the capacity of the sampling capacitor 144 has to be chosen to provide a short charging time as well as sufficient holding time for the sampled voltage $U_{nsamp}$ over one period unto the next sampling.

One major advantage of this circuit is that the comparator 132 needs not to be very fast, since only the static sampled voltage $U_{nsamp}$, which is static after each sampling, has to be compared. Further, the parasitic inductance and capacitance on the connection node 120 which cause decay and oscillation when the node voltage $U_n$ is dropping to $U_{in}$ as is indicated at 150 in FIG. 4, do not matter any more for the detection of the transition. The transition between continuous and discontinuous mode of the boost converter can reliably be detected. Hence, the boost converter can be controlled accurately according to its mode and therefore be operated in a most efficient way.

Without the need of extra sensing lines to the rectifying device for measuring a coil current, the proposed boost converter further allows an easy configuration, especially if it is desired to locate the rectifying device external from the chip which is hosting the other components.

Various modifications of the proposed circuit imply without leaving the scope of the present invention. For example, the diode may be replaced by a controlled switch such as a PMOS-FET or another kind of rectifying device.

The invention claimed is:

1. A DC-DC high frequency boost converter, comprising:
   a supply voltage input (110):
   a boosted voltage output (112);
   a series circuit of an inductor (114) and a rectifying device (116) connected in series between said supply voltage input (110) and said boosted voltage output (112);
   a switch (124) connected between a connection node (120) of said inductor (114) and said rectifying device (116) and ground;
   a control circuit (126) for controlling said switch (124); and
   a zero inductor current detection circuit (128) that compares a voltage (On) on said connection node (120) with a reference voltage ($U_{ref}$) and provides a zero inductor current indication (Comp) when both voltages are equal;

wherein the zero current detection circuit (128) comprises a comparator (132) with a first input connected to said connection node (120) trough a sampling switch (146), a second input connected to a reference voltage source (134) and an output connected to a control input of said control circuit (126).

2. The converter according to claim 1, wherein a sampling capacitor (144) is connected to the first input of the comparator (132).

3. The converter according to claim 1, wherein the reference voltage source (134) comprises a current source (132) connected in series with a resistor (140) between said supply voltage input (110) and ground.

4. The converter according to claim 2, wherein the reference voltage ($U_{ref}$) is selected to compensate for the charging time of the sampling capacitor (144).

5. The converter according to claim 4, wherein the reference voltage ($U_{ref}$) is on the order of a few mV.

* * * * *